(12) United States Patent
Mizukawa et al.

(10) Patent No.: US 8,502,463 B2
(45) Date of Patent: Aug. 6, 2013

(54) LED DRIVER CIRCUIT WITH OPEN LOAD DETECTION AND ASSOCIATED CONTROL METHOD

(75) Inventors: Hiromitsu Mizukawa, Suita (JP); Kazuhiro Kumada, Himeji (JP); Yoshifumi Kuroki, Moriguchi (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 13/031,836

(22) Filed: Feb. 22, 2011

(65) Prior Publication Data

US 2011/0204823 A1    Aug. 25, 2011

(30) Foreign Application Priority Data

Feb. 22, 2010    (JP) .................................. 2010-036033

(51) Int. Cl.
*H05B 39/02* (2006.01)

(52) U.S. Cl.
USPC ....... 315/209 R; 315/119; 315/307; 315/308; 315/297

(58) Field of Classification Search
USPC .................. 315/119, 121, 122, 125, 127, 128, 315/160, 161, 172, 185 R, 186, 192, 193, 315/315/200 R, 201, 209 R, 210, 225, 246, 315/247, 250, 291, 297, 306, 307, 308, 310, 315/312, 313, 362

See application file for complete search history.

(56) References Cited

FOREIGN PATENT DOCUMENTS

JP    2008-278641    11/2008

*Primary Examiner* — Douglas W Owens
*Assistant Examiner* — Jianzi Chen
(74) *Attorney, Agent, or Firm* — Waddey & Patterson, P.C.; Mark J. Patterson; Gary L. Montle

(57) ABSTRACT

An LED driver circuit prevents an increase in output voltage of a DC/DC converter in an open circuit condition associated with removal or failure of an LED lighting device. A DC power source provides a first DC voltage across positive and negative voltage rails. A DC/DC converter includes a switching element which when turned ON/OFF provides a second DC voltage across first and second ends of a capacitor which further define first and second LED lighting device connection terminals. A control circuit, upon receiving a drive power signal, turns ON/OFF the switching element to provide constant current control. A power supply circuit is coupled between the second LED lighting device connection terminal and the negative voltage rail and generates the drive power signal to the control circuit during a detected lighting condition. The power supply circuit further disables the drive power signal during a detected open circuit condition.

20 Claims, 1 Drawing Sheet

US 8,502,463 B2

LED DRIVER CIRCUIT WITH OPEN LOAD DETECTION AND ASSOCIATED CONTROL METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: Japan Patent Application No. 2010-036033, filed Feb. 22, 2010.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to LED driver circuits for driving LED lighting devices formed by an array of light-emitting diodes. More particularly, the present invention relates to an LED driver circuit effective to prevent continuous driving in an open load state such as when the light-emitting diodes are removed or otherwise disconnected from the output terminals of the LED driver circuit to form an open circuit.

An example of an LED driver circuit as previously known in the art (and as represented in FIG. 2) is formed by an AC power source AC, a diode bridge DB, a DC/DC converter 1, an LED lighting device 2, and a control circuit 3.

The AC power source AC is a commercial power source. In this conventional example, the AC power source AC outputs an AC voltage V1 of 100 V to the diode bridge DB. The diode bridge DB functions as a full-wave rectifying circuit, and a capacitor C1, such as an electrolytic capacitor, is coupled across output ends of the diode bridge DB. The diode bridge DB rectifies the AC voltage V1 so as to generate a DC voltage V2$a$ of substantially 140 V across the capacitor C1.

The DC/DC converter 1 is a step-down chopper (buck converter) circuit with a diode D1, a capacitor C2, an inductor L1, and a switching element Q1. The capacitor C2 may be an electrolytic capacitor and the switching element Q1 may be an n-type channel MOSFET.

A series circuit of the capacitor C2, the inductor L1, the switching element Q1, and a resistor R1 is coupled in parallel with the capacitor C1. A positive electrode of capacitor C2 is coupled to a positive electrode of capacitor C1, and a negative electrode of capacitor C2 is connected to inductor L1. The drain terminal of switching element Q1 is coupled to inductor L1, the gate terminal is coupled to the control circuit 3, and the source terminal is coupled to a negative electrode of capacitor C1 via resistor R1. The diode D1 is coupled in parallel with capacitor C2 and inductor L1. The anode terminal of diode D1 is coupled to a node between inductor L1 and switching element Q1. The cathode terminal is coupled to the positive electrode of capacitor C2.

In the DC/DC converter 1 (buck converter) having the above described configuration, the switching element Q1 is turned ON/OFF by the control circuit 3 so that the AC voltage V2$a$ is converted to a DC voltage V3 across the capacitor C2.

The LED lighting device 2 includes a plurality of light-emitting diodes, and is coupled in parallel to capacitor C2. A driving current through the LED lighting device 2 is caused to flow in accordance with the DC voltage V3 generated across the capacitor C2.

The control circuit 3 has a DC power source E as an input power source, and controls switching element Q1 of the DC/DC converter 1 so that a predetermined LED current flows through the LED lighting device 2. The control circuit 3 detects current flowing through switching element Q1 by detecting a voltage across resistor R1. The control circuit 3 also detects current flowing through inductor L1. When the current flowing through switching element Q1 exceeds a predetermined value, the control circuit 3 turns OFF switching element Q1. When the current flowing through inductor L1 falls below a predetermined value, the control circuit 3 turns ON switching element Q1. Thereby, the control circuit 3 controls the current flowing through the LED lighting device 2 to be substantially constant (i.e., a constant current control operation).

An open circuit state wherein the LED lighting device 2 is not coupled to the LED driver circuit (i.e., an open circuit across output terminals of the LED driver circuit) will now be described. When the LED lighting device 2 is not connected, current does not flow through switching element Q1 and control circuit 3 keeps driving switching element Q1 in an ON state. The negative electrode of capacitor C1 and the negative electrode of capacitor C2 are thereby at substantially the same potential, and DC voltage V2 is applied across capacitor C2. Therefore, in the LED driver circuit of the conventional example as shown in FIG. 2, it is necessary to select a high voltage electrolytic capacitor as a capacitor C3 to be used in the output end of the DC/DC converter, which results in an undesirable increase in cost.

BRIEF SUMMARY OF THE INVENTION

In accordance with an aspect of the present invention, an LED driver circuit is provided in which a control circuit is not started up in an open circuit state, such as a state in which light-emitting diodes are removed or otherwise disconnected from output terminals of the LED driver circuit.

In another aspect of the present invention, an LED driver circuit is provided to prevent an increase in output voltage of a DC/DC converter in an unloaded state even at the time of lighting light-emitting diodes.

In an embodiment, an LED driver circuit in accordance with the present invention is provided for preventing an increase in an output voltage of a DC/DC converter in an open circuit condition associated with removal or failure of an LED lighting device. A DC power source provides a first DC voltage across positive and negative voltage rails. A DC/DC converter includes a switching element which, when turned ON/OFF, provides a second DC voltage across first and second ends of a capacitor which further define first and second LED lighting device connection terminals. A control circuit, upon receiving a drive power signal, turns ON/OFF the switching element to provide constant current control. A power supply circuit is coupled between the second LED lighting device connection terminal and the negative voltage rail and generates the drive power signal to the control circuit during a detected lighting condition. The power supply circuit further disables the drive power signal during a detected open circuit condition.

In another embodiment of the present invention, a method is provided for operating an LED driver circuit including a DC/DC power converter having an inductor, a switching element and first and second output terminals effective to receive an LED lighting device. A lighting condition is detected in association with an LED lighting device coupled to the second output terminal. A drive signal is generated to a control circuit based on detection of the lighting condition, and the control circuit controls ON/OFF switching of the switching element in response to the drive signal, so as to maintain constant current control during the lighting condition. An open circuit condition is detected in association with removal or failure of the LED lighting device at the second output terminal, and the drive signal to the control circuit is disabled based on detection of the open circuit condition, which has the effect of further disabling the constant current control and preventing an increase in the DC voltage output from the DC/DC converter.

In another embodiment of the present invention, an LED driver circuit includes a DC power source which provides DC power across positive and negative voltage rails. A diode and a capacitor each have first ends coupled to the positive rail, with an inductor coupled between second ends of the diode and the capacitor. A switching element has a drain terminal coupled to a node between the inductor and the diode, and a gate terminal coupled to a control circuit which turns ON/OFF the switching element in response to a drive signal. A power supply circuit includes a resistor and a second capacitor coupled in series between the second end of the first capacitor and the negative voltage rail, with the control circuit coupled in parallel with the second capacitor. A DC voltage across the second capacitor effectively generates the drive signal to the control circuit, wherein removal or interruption of the DC voltage across the second capacitor is likewise effective to disable the control circuit.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The term "controller" or "control circuit" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Figure 1:
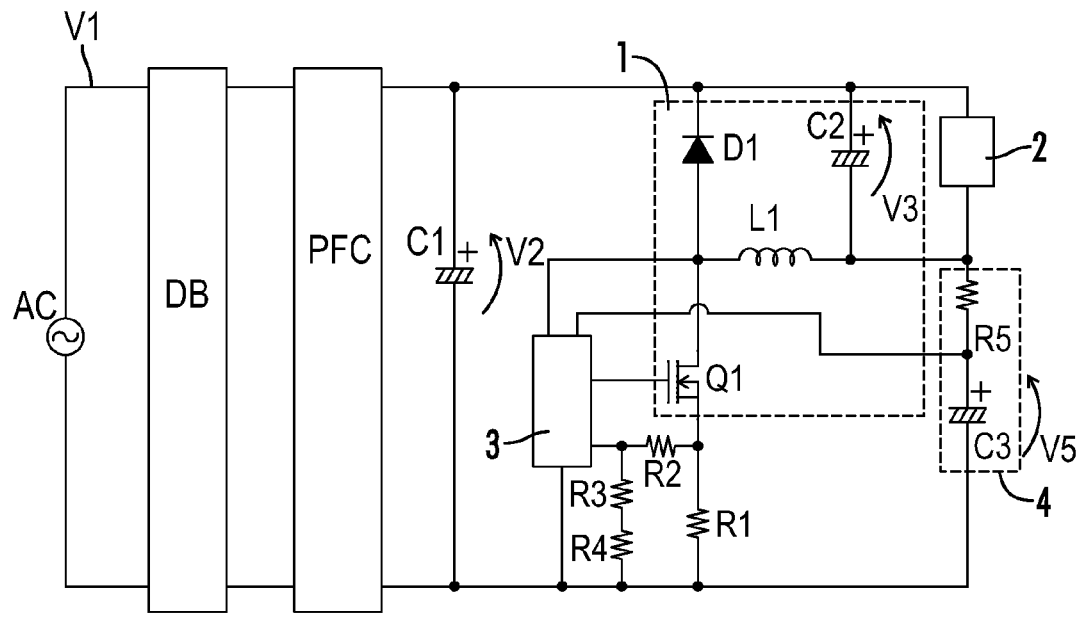
FIG. 1 is a circuit block diagram representing an LED driver circuit according to an embodiment of the present invention.
Figure 2:
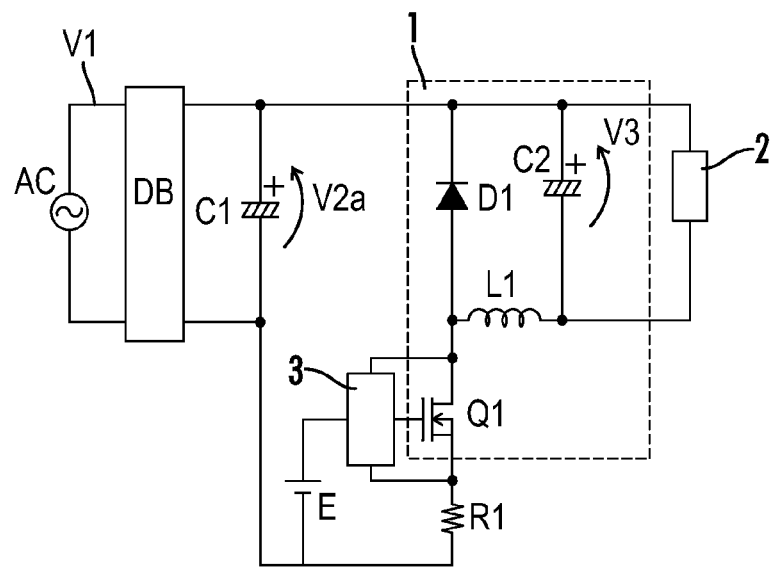
FIG. 2 is a circuit block diagram representing an example of an LED driver circuit as previously known in the art.

An embodiment of an LED driver circuit in accordance with the present invention (and as represented in FIG. 1) includes an AC power source AC, a diode bridge DB, a DC/DC converter 1, first and second output terminals (lighting device connection terminals) to which an LED lighting device 2 may be coupled, a control circuit 3, a power factor correction circuit PFC, and a power supply circuit 4. It should be noted that components having the same configuration as that previously described with reference to the conventional example represented in FIG. 2 will be given the same reference numerals and further description thereof will be omitted.

In an LED driver circuit according to the embodiment shown, a power factor correction circuit PFC (a DC power source) is coupled to an output stage of the diode bridge DB. The power factor correction circuit PFC may be configured as a step-up chopper (boost converter) circuit, for stepping up a rectified voltage from the diode bridge DB to a desired DC voltage, such that the DC voltage is smoothed by capacitor C1 and a DC voltage V2 (first DC voltage) is generated across the smoothing capacitor C1. The power factor correction circuit PFC corrects a power factor of an input current by bringing the input current close to a sinusoidal wave.

The DC/DC converter 1 steps down the DC voltage V2 and generates a DC voltage V3 (second DC voltage) across a capacitor C2.

The control circuit 3 controls turning ON/OFF of a switching element Q1 of the DC/DC converter 1 so that a predetermined LED current flows through the LED lighting device 2. A switch current detection circuit may be formed of a series circuit of resistors R2, R3 and R4 coupled in parallel to a resistor R1, further coupled between a source terminal of the switching element Q1 and a negative electrode of the capacitor C1. The control circuit 3 detects current flowing through the switching element Q1 by detecting a voltage V4 from the switch current detection circuit, or in other words as generated in a node between the resistors R2 and R3. When the switching element Q1 is turned ON, current flows through the switching element Q1, and when the voltage V4 exceeds a predetermined threshold value V4a (a first threshold value), the control circuit 3 turns OFF the switching element Q1. In one embodiment, the resistor R3 may be a variable resistor capable of varying the predetermined value V4a by changing the resistance value of the resistor R3.

The control circuit 3 is coupled to a node between inductor L1 and diode D1, and detects current flowing through the inductor L1 (the "inductor current"). When the switching element Q1 is turned OFF from a state in which the switching element Q1 is turned ON, and current flows through inductor L1, a counter-electromotive voltage is generated in inductor L1. Current flowing from inductor L1 to LED lighting device 2 via diode D1 is generated by the counter-electromotive voltage. The control circuit 3 detects the inductor current flowing through the inductor L1, and turns ON the switching element Q1 when the inductor current becomes less than a predetermined threshold value (a second threshold value). With the above configuration, the control circuit 3 controls the LED current flowing through the LED lighting device 2 to be substantially constant by repeatedly turning ON/OFF the switching Q1.

The power supply circuit 4 is coupled to the second output terminal (lighting device connection terminal) so as to form a series circuit with LED lighting device 2 coupled across the first and second output terminals, and coupled in parallel with the capacitor C1. A first (anode) side of the LED lighting device 2 is coupled to a high voltage line (positive rail) that is coupled to a positive electrode of the capacitor C1. One end of the power supply circuit 4 is coupled to a low voltage line (negative rail) coupled to a negative electrode of the capacitor C1. The power supply circuit 4 is further configured by connecting a resistor R5 and a capacitor C3, such as an electrolytic capacitor, in series. One end of resistor R5 is coupled to a second (cathode) side of LED lighting device 2. The other end of resistor R5 is coupled to a positive electrode of capacitor C3. A negative electrode of capacitor C3 is coupled to a negative electrode of capacitor C1.

The power supply circuit 4 may effectively detect a lighting state associated with the presence of an LED lighting device 2 coupled across the output terminals. This occurs as the capacitor C3 is thereby electrically charged by the DC voltage V2 output by the power factor correction circuit PFC via the LED lighting device 2 and the resistor R5, such that a DC voltage V5 is generated across the capacitor C3.

The control circuit 3 is coupled in parallel with the capacitor C3, and the DC voltage V5 generated across the capacitor C3 serves as a drive power source for the control circuit 3.

With the above described configuration, and in a case where the LED lighting device 2, when coupled in series to a high voltage side of the power supply circuit 4, is removed or an open circuit state is otherwise generated due to failure of the LED lighting device 2 during startup of the LED driver circuit, the power supply circuit 4 detects an open circuit condition wherein a charging path is interrupted so that capacitor C3 is not electrically charged. Therefore, because the DC voltage V5 is not generated across capacitor C3, a drive power signal is not provided to the control circuit 3 and the control circuit 3 is accordingly disabled. Similarly, in the case where LED lighting device 2 is removed or an open circuit state is otherwise generated due to failure of LED lighting device 2 during normal lighting operation, capacitor C3 is not electrically charged as well, so that the control circuit 3 is disabled. When the control circuit 3 is disabled, a switch drive signal is not provided to the switching element Q1, such that the switching element Q1 is maintained in an OFF state.

Irrespective of whether LED lighting device 2 is being started up or has already been activated, when LED lighting device 2 is in an open circuit state, the switching element Q1 may therefore be maintained in the OFF state, and an increase in output voltage of the DC/DC converter 1 via constant current control of the control circuit 3 can be prevented. Therefore, there is no need for using a high voltage electrolytic capacitor as capacitor C2, and cost can accordingly be reduced.

Although the DC/DC converter 1 of an embodiment as represented in FIG. 1 is a step-down chopper (buck converter) circuit, the DC/DC converter may in various embodiments be alternatively formed by a half bridge circuit or a step-up/down chopper circuit.

The control circuit 3 may in certain embodiments be configured as an integrated circuit in which the switching element Q1 and the resistors R1 to R4 are incorporated (so-called IPD (Intelligent Power Device)). Thereby, the configuration of the LED driver circuit can be simplified.

Thus, although there have been described particular embodiments of the present invention of a new and useful "LED Driver Circuit with Open Load Detection and Associated Control Method," it is not intended that such references be construed as limitations upon the scope of this invention except as set forth in the following claims.

What is claimed is:
1. An LED driver circuit comprising:
 a DC power source effective to provide a first DC voltage across positive and negative voltage rails;
 a DC/DC converter comprising
  a switching element having a drain terminal and a source terminal and a converter capacitor,
  the DC/DC converter effective by turning ON/OFF the switching element to provide a second DC voltage across the converter capacitor,
  the converter capacitor having first and second converter capacitor terminals defining first and second LED lighting device connection terminals, the first converter capacitor terminal coupled to the positive voltage rail;
 a switch current detection circuit coupled between the source terminal of the switching element and the negative voltage rail;
 a control circuit coupled to the DC/DC converter and effective upon receiving a drive power signal to control turning ON/OFF of the switching element wherein a constant current is maintained through an LED lighting device when it is coupled to the first and second connection terminals, the control circuit further effective to turn OFF the switching element based on a signal from the switch current detection circuit;
 a power supply circuit coupled between the second LED lighting device connection terminal and the negative voltage rail, the power supply circuit effective to detect a lighting condition at the second connection terminal and generate said drive power signal to the control circuit during said lighting condition, the power supply circuit further effective to detect an open circuit condition at the second connection terminal and disable said drive power signal during said open circuit condition.

2. The LED driver circuit of claim 1, wherein the control circuit is further effective to turn OFF the switching element based on a comparison of a voltage received from the switch current detection circuit to a first predetermined threshold value.

3. The LED driver circuit of claim 2, the switch current detection circuit comprising a variable resistance effective to adjust the first predetermined threshold voltage.

4. The LED driver circuit of claim 3, the DC/DC converter further comprising:
an inductor coupled between the second converter capacitor terminal and the drain terminal of the switching element;
a diode coupled between the inductor and the positive voltage rail; and
the control circuit is further effective to turn ON the switching element based on a detected current in the inductor being less than a second predetermined threshold value.

5. The LED driver circuit of claim 1 further comprising:
the power supply comprising a power supply resistor coupled to the second LED lighting device connection terminal;
a power supply capacitor coupled between the power supply resistor and the negative voltage rail; and
the control circuit is further coupled to a node between the power supply resistor and the power supply capacitor.

6. The LED driver circuit of claim 5, the power supply capacitor comprising an electrolytic capacitor.

7. The LED driver circuit of claim 1, wherein the control circuit comprises an integrated circuit.

8. The LED driver circuit of claim 1, wherein the DC power source comprises a step-up chopper circuit.

9. A method of operating an LED driver circuit comprising a DC/DC power converter having an inductor, a switching element, and first and second output terminals effective to receive an LED lighting device, the method comprising:
detecting a lighting condition associated with an LED lighting device at the second output terminal;
generating a drive signal to a control circuit based on detection of the lighting condition;
controlling ON/OFF switching of the switching element in response to the drive signal, the ON/OFF control effective to maintain constant current control during the lighting condition, the controlling ON/OFF switching of the switching element further comprising turning off the switching element when a detected voltage across the switching element exceeds a first threshold value;
detecting an open circuit condition associated with removal or failure of the LED lighting device at the second output terminal; and
disabling the drive signal to the control circuit based on detection of the open circuit condition, wherein constant current control is disabled during the open circuit condition.

10. The method of claim 9, further comprising regulating the first threshold value.

11. The method of claim 10, wherein regulating the first threshold value comprises setting a resistance associated with a variable resistor coupled to a node between the control circuit and a drain terminal of the switching element.

12. The method of claim 9, further comprising detecting a current through the inductor and turning ON the switching element when the detected inductor current drops below a second threshold value.

13. An LED driver circuit comprising:
a DC power source effective to provide DC power across positive and negative voltage rails;
a diode and a capacitor having first ends coupled to the positive rail and second ends;
an inductor coupled between second ends of the diode and the capacitor;
a switching element having a gate terminal and a drain terminal, the drain terminal coupled to a node between the inductor and the diode;
a control circuit coupled to the gate terminal of the switching element and effective to turn ON/OFF the switching element in response to a drive signal; and
a power supply circuit comprising a resistor and a second capacitor coupled in series between the second end of the first capacitor and the negative voltage rail, the control circuit coupled in parallel with the second capacitor; and
a DC voltage across the second capacitor is effective to generate the drive signal to the control circuit, wherein removal or interruption of the DC voltage across the second capacitor is effective to disable the control circuit.

14. The LED driver circuit of claim 13, wherein the control circuit is further effective to detect a voltage across the switching element and turn off the switching element when the detected voltage across the switching element exceeds a first threshold value.

15. The LED driver circuit of claim 14, further comprising:
a second resistor coupled between a source terminal of the switching element and the control circuit;
a third resistor having a first end coupled to a node between the second resistor and the control circuit and a second end coupled to the positive voltage rail; and
wherein the voltage across the switching element is detected by the control circuit via the node between the second and third resistors.

16. The LED driver circuit of claim 15, the third resistor comprising a variable resistance effective to regulate the first threshold value.

17. The LED driver circuit of claim 14, the control circuit further effective to detect a current through the inductor and turn ON the switching element when the detected inductor current drops below a second threshold value.

18. The LED driver circuit of claim 13, the capacitor comprising an electrolytic capacitor.

19. The LED driver circuit of claim 13, wherein the control circuit comprises an integrated circuit.

20. The LED driver circuit of claim 13, wherein the DC power source comprises a step-up chopper circuit.

* * * * *